(12) United States Patent
Ou et al.

(10) Patent No.: US 8,077,854 B2
(45) Date of Patent: *Dec. 13, 2011

(54) PROTECTION COVER AND ELECTRONIC DEVICE USING THE SAME

(75) Inventors: Chung-Yuan Ou, Taoyuan (TW); Ching-Shih Chen, Taoyuan (TW); Chang-Hwang Chiou, Taoyuan (TW); Chin-Chung Shih, Taoyuan (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 936 days.

This patent is subject to a terminal disclaimer.

(21) Appl. No.: 12/052,763

(22) Filed: Mar. 21, 2008

(65) Prior Publication Data

US 2008/0230437 A1    Sep. 25, 2008

Related U.S. Application Data

(60) Provisional application No. 60/896,282, filed on Mar. 22, 2007.

(30) Foreign Application Priority Data

Sep. 11, 2007  (TW) .............................. 96133957 A

(51) Int. Cl.
*H04M 5/00* (2006.01)
(52) U.S. Cl. ........ 379/330; 379/331; 379/426; 379/427; 379/428.01; 379/447; 455/575.1; 455/575.3; 455/575.4; 455/575.8; 455/90.3

(58) Field of Classification Search .................. 379/329, 379/330, 331, 433.11, 433.12, 433.13; 455/575.4, 455/575.8, 90.3; 361/679
See application file for complete search history.

(56) References Cited

U.S. PATENT DOCUMENTS

| | | | |
|---|---|---|---|
| 2005/0078817 A1* | 4/2005 | Lee | 379/433.12 |
| 2005/0181745 A1* | 8/2005 | Wood et al. | 455/90.3 |
| 2006/0121963 A1* | 6/2006 | Gartrell et al. | 455/575.8 |
| 2006/0234786 A1* | 10/2006 | Taniguchi et al. | 455/575.4 |
| 2007/0120710 A1* | 5/2007 | Rak et al. | 341/22 |
| 2008/0019083 A1* | 1/2008 | Lim et al. | 361/679 |
| 2010/0124001 A1* | 5/2010 | Zhou et al. | 361/679.01 |
| 2010/0259872 A1* | 10/2010 | Yang et al. | 361/679.01 |

* cited by examiner

*Primary Examiner* — Joseph J Nguyen
(74) *Attorney, Agent, or Firm* — Thomas|Kayden

(57) ABSTRACT

An electronic device and a protection cover thereof are provided. The electronic device includes a cap body, a main body, a flexible printed circuit board and a protection cover. The protection cover includes a receiving portion and a combining portion. The receiving portion has a first end and a second end, wherein the first end is coupled to an upper surface of the main body and the second end connects to the combining portion. As the cap body moves from a first position to a second position on the main body, the combining portion is coupled to a bottom surface of the cap body, so that when the cap body rotates in the second position, the protection cover moves along with the cap body and covers the flexible printed circuit board.

20 Claims, 22 Drawing Sheets

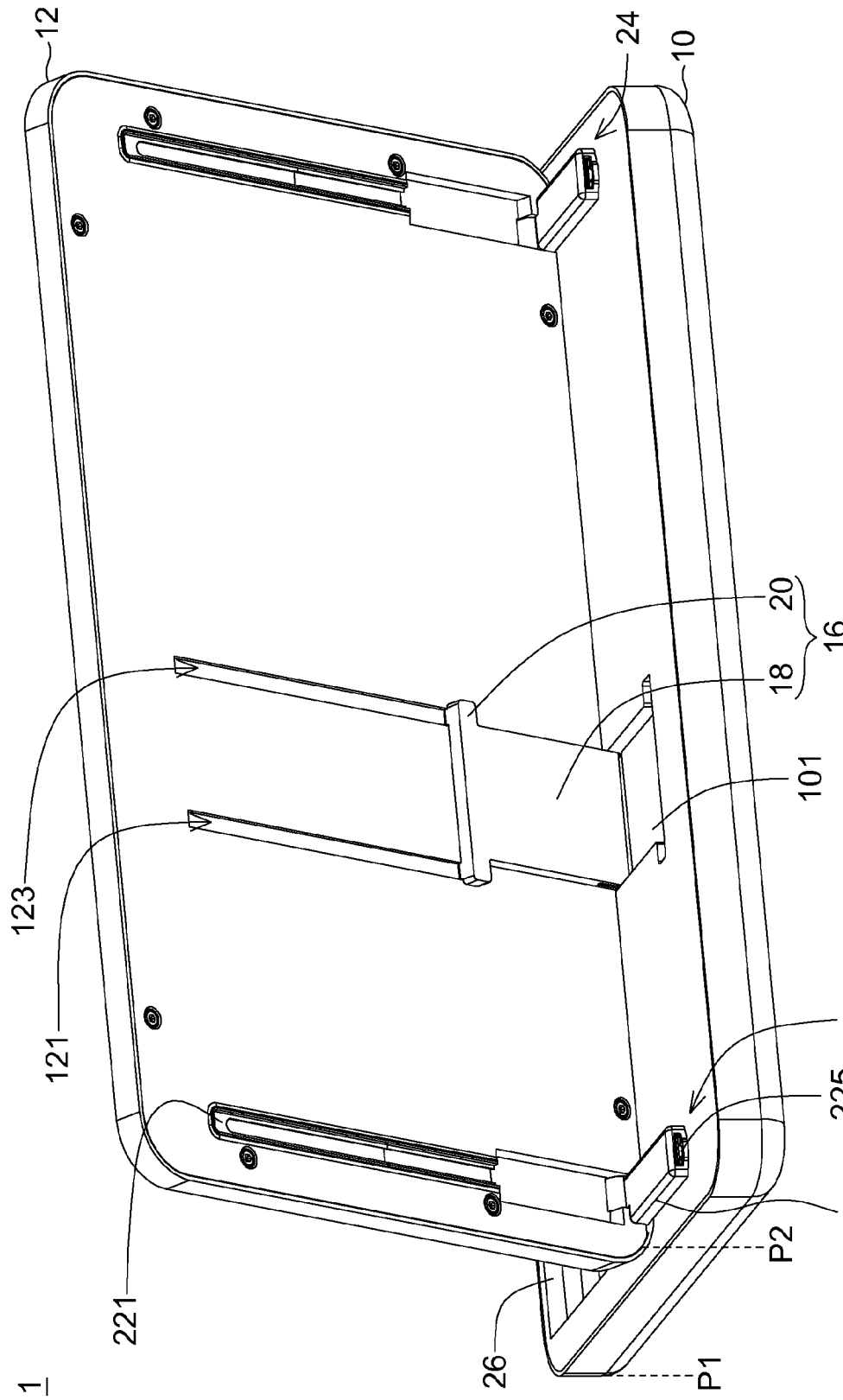

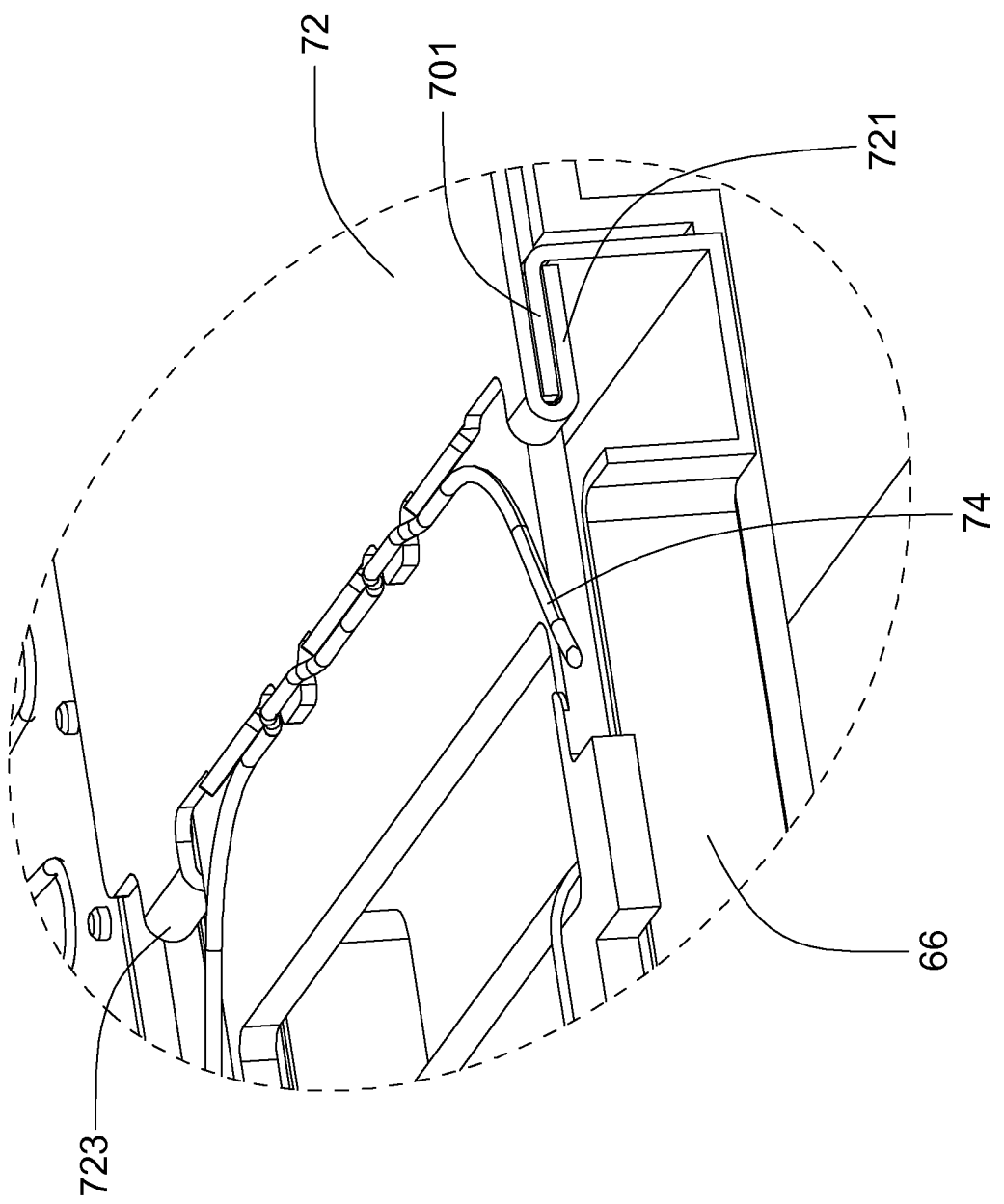

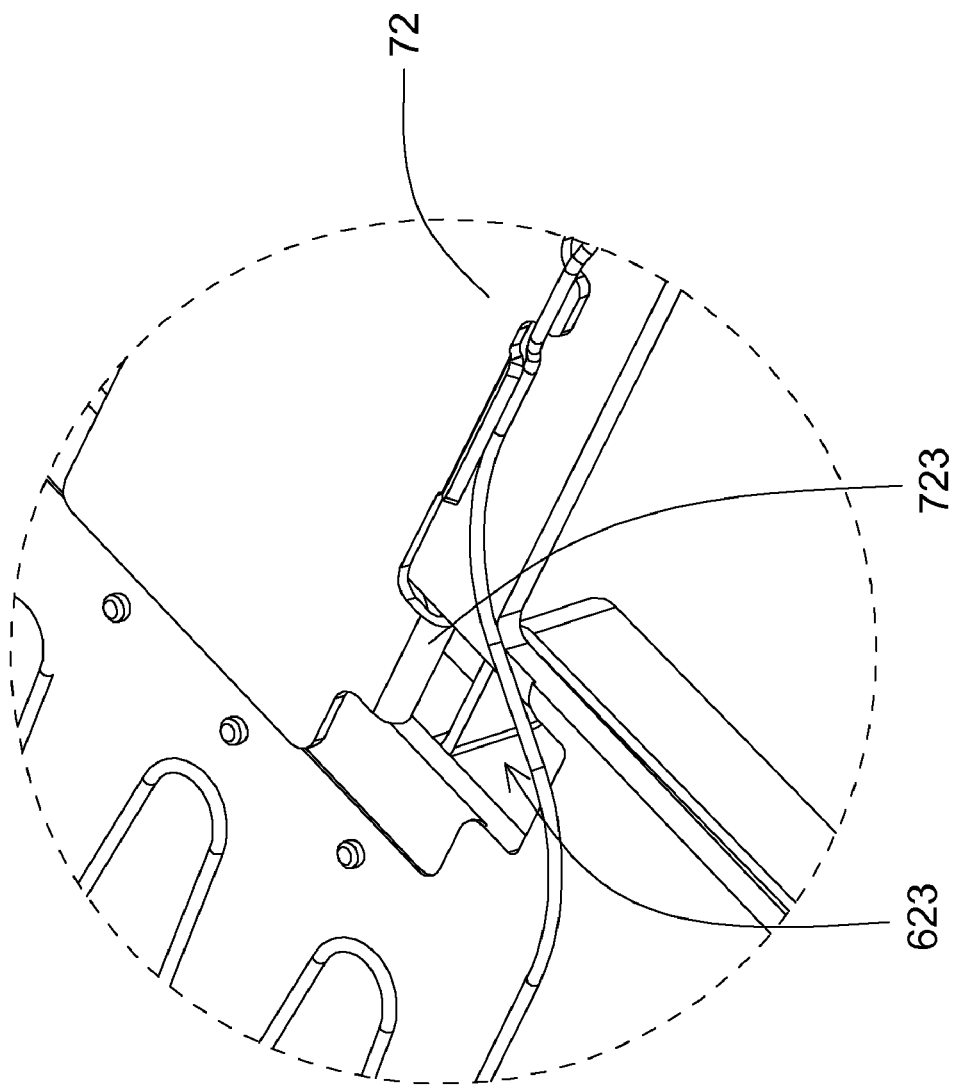

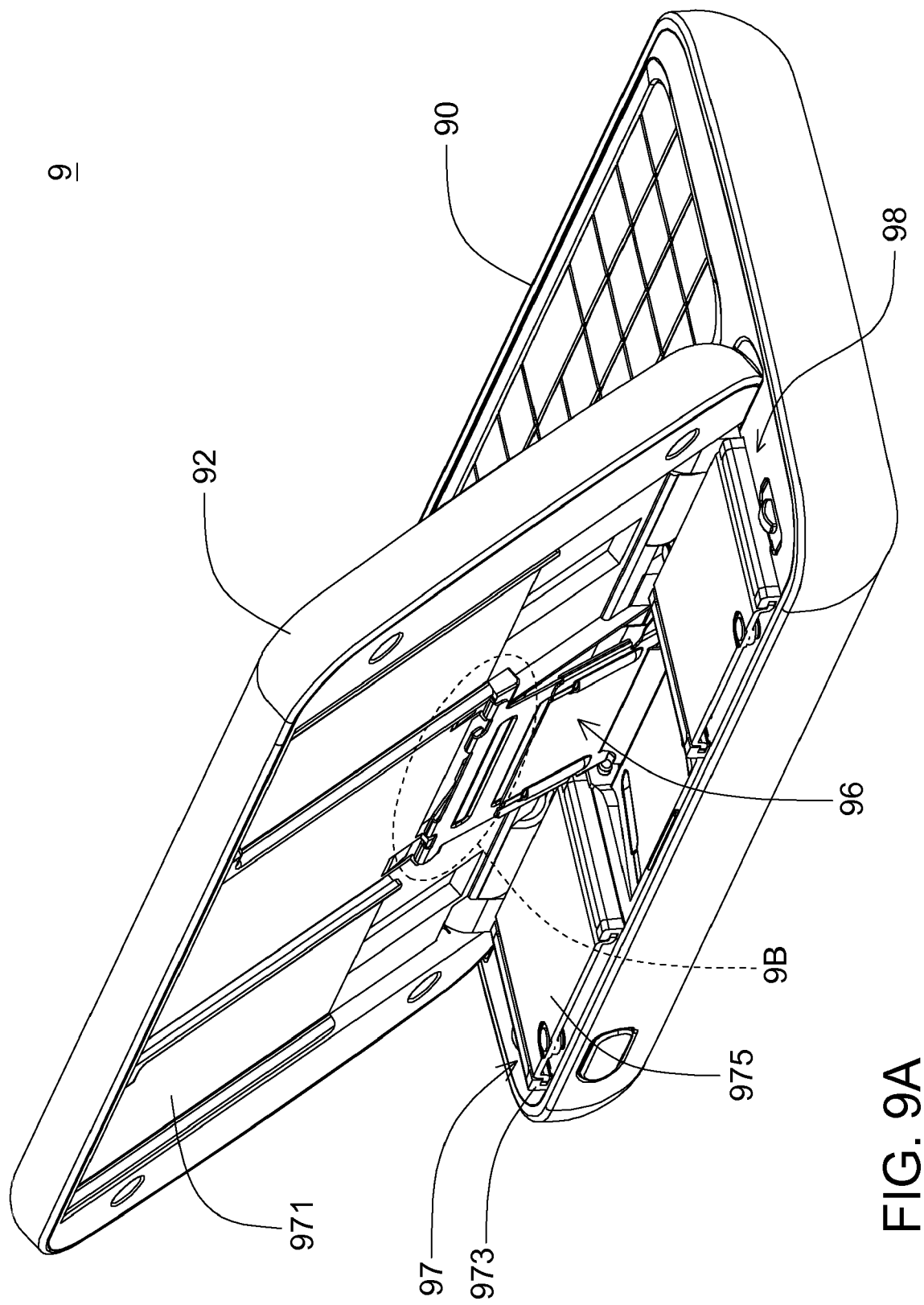

PROTECTION COVER AND ELECTRONIC DEVICE USING THE SAME

This application claims the benefit of U.S. Provisional Application Ser. No. 60/896,282, filed Mar. 22, 2007 and Taiwan application Serial No. 96133957, filed Sep. 11, 2007, the subject matter of which is incorporated herein by reference.

BACKGROUND OF THE INVENTION

1. Field of the Invention

The invention relates in general to a protection cover, and more particularly to a protection cover for protecting a flexible printed circuit board in an electronic device.

2. Description of the Related Art

Nowadays, many electronic devices such as folding phones, slide phones, personal digital assistants, digital cameras, etc. are composed of a cap body and a main body. The signal between the cap body and the main body is transmitted via a flexible printed circuit board that connects to the main body and the cap body. The cap body and the main body are usually attached by a sliding hinge or a rotating hinge so that the cap body can slide on the main body or rotate relative to the main body.

An electronic device having both a sliding hinge and a rotating hinge has been released on the market recently. The cap body of the electronic device can slide on its main body and rotate relative to the same. It is noted that the cap body rotates only after the cap body slides to a particular position on the main body. However, part of the flexible printed circuit board is exposed to the outside though an opening in the cap body or the main body after rotating the cap body. The exposed flexible printed circuit board is more likely to be damaged due to environmental factors such as artificial factor or humidity, which deteriorates the quality of the flexible printed circuit board and degrades the signal transmission.

SUMMARY OF THE INVENTION

It is therefore an object of the invention to provide a protection cover and an electronic device using the same. While operating the electronic device, the protection cover isolates the flexible printed circuit board from the exterior, so that the flexible printed circuit board does not get damaged easily.

The invention achieves the above-identified object by providing a protection cover that is used in an electronic device having a cap body, a main body and a flexible printed circuit board. The protection cover includes a receiving portion and a combining portion. The receiving portion has a first end coupled to an upper surface of the main body and a second end connecting to the combining portion. As the cap body moves from a first position to a second position on the main body, the combining portion is coupled to a bottom surface of the cap body, so that when the cap body rotates in the second position, the protection cover moves along with the cap body and covers the flexible printed circuit board.

The invention achieves the above-identified object by further providing an electronic device that includes a cap body, a main body, a flexible printed circuit board, and a protection cover. The cap body is movably disposed on the main body. As the cap body moves from a first position to a second position on the main body, the cap body can rotate relative to the main body. The flexible printed circuit board connects to the main body and the cap body. The protection cover includes a receiving portion and a combining portion. The receiving portion has a first end coupled to an upper surface of the main body and a second end connecting to the combining portion. When the cap body is in the second position on the main body, the combining portion is coupled to a bottom surface of the cap body, so that when the cap body rotates in the second position, the protection cover moves along with the cap body and covers the flexible printed circuit board.

Other objects, features, and advantages of the invention will become apparent from the following detailed description of the preferred but non-limiting embodiments. The following description is made with reference to the accompanying drawings.

BRIEF DESCRIPTION OF THE DRAWINGS

FIG. 2A shows the rear side of the electronic device in FIG. 1D;

FIG. 8C is an enlarged diagram of the electronic device in FIG. 8B;

FIG. 8E is an enlarged diagram of the electronic device in FIG. 8D;

FIG. 9A shows an electronic device according to the third embodiment of the invention;

DETAILED DESCRIPTION OF THE INVENTION

First Embodiment

Figure 1A:
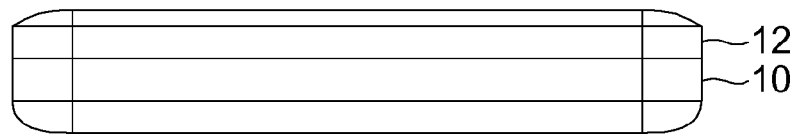
FIGS. 1A to 1D show an electronic device in continuous motion according to the first embodiment of the invention.

FIGS. 1A to 1D show an electronic device in continuous motion according to the first embodiment of the invention. The electronic device 1 includes a main body 10 and a cap body 12 that is movably disposed on the main body 10. The cap body 12 moves between a first position P1 and a second position P2 on the main body 10 and the cap body 12 rotates relative to the main body 10 in the second position P2. The electronic device 1 further includes a flexible printed circuit board 14 (shown in FIG. 2B) and a protection cover 16. The flexible printed circuit board 14 connects to the main body 10 and the cap body 12. As the cap body 12 rotates in the second position P2, the protection cover 16 moves along with the cap body 12 and covers the flexible printed circuit board 14.

Figure 1B:
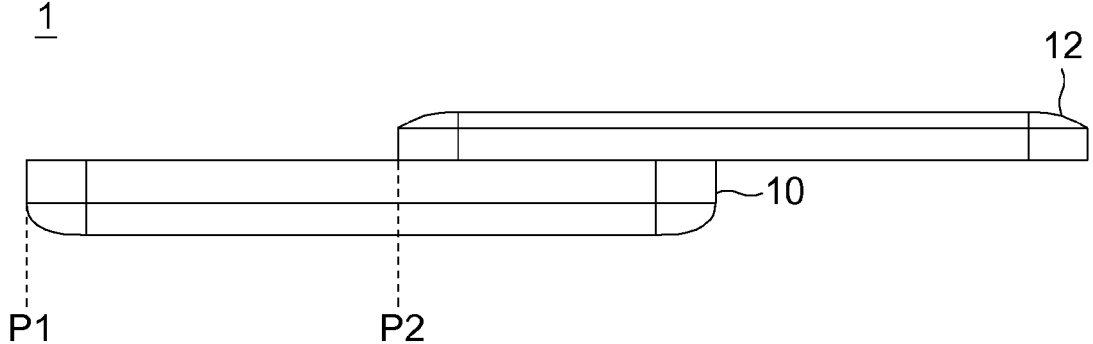
Figure 1C:
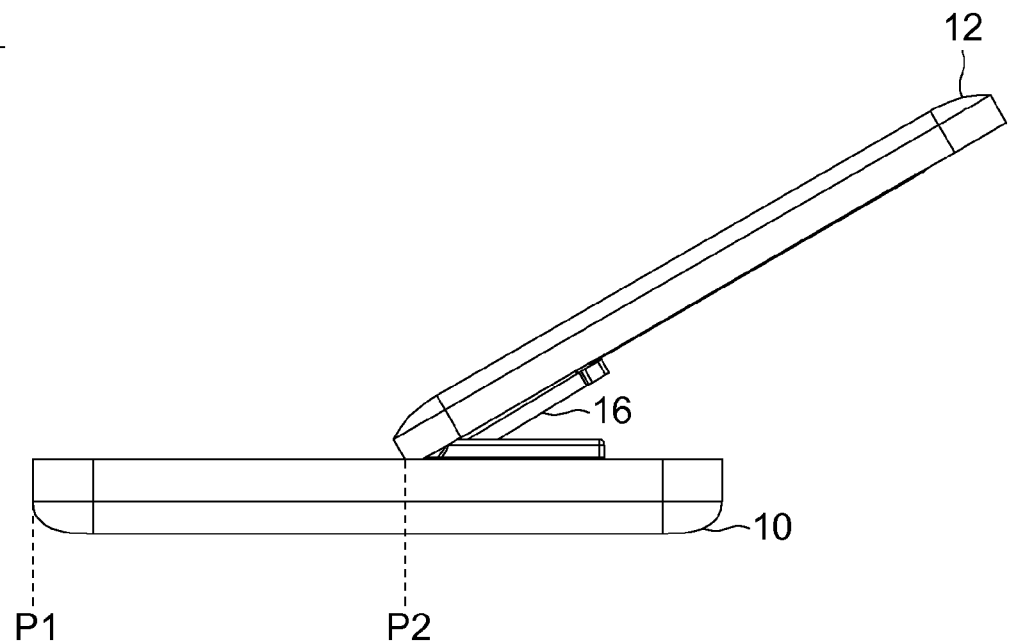
Figure 1D:
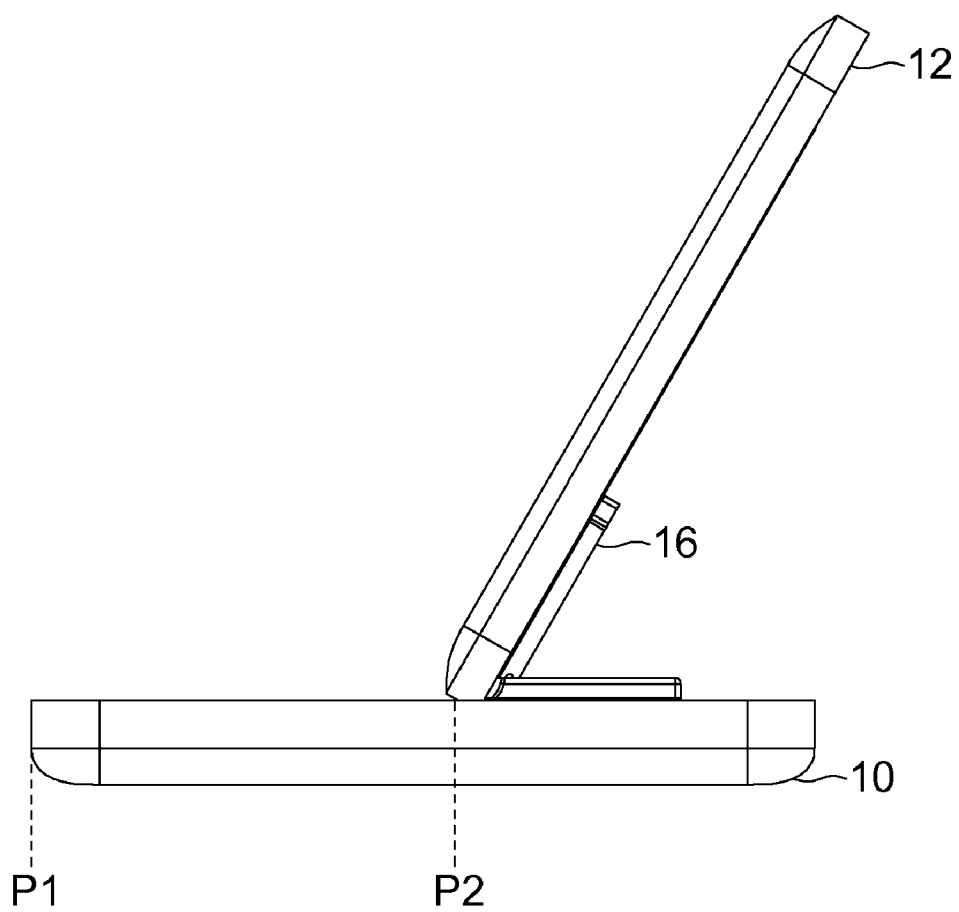
Figure 2B:
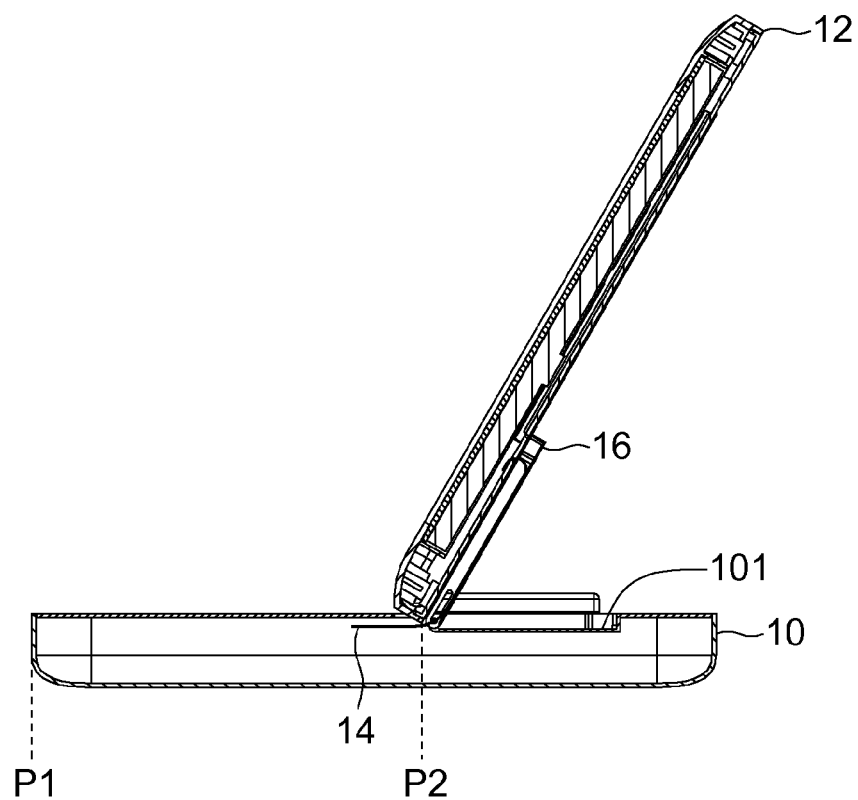
FIG. 2B is a cross-sectional view of the electronic device in FIG. 1D.

FIG. 2A shows the rear side of the electronic device in FIG. 1D, and FIG. 2B is a cross-sectional view of the electronic device in FIG. 1D. The protection cover 16 includes a receiving portion 18 and a combining portion 20. The receiving portion 18 has one end coupled to the upper surface of the main body 10 and the other end connected to the combining portion 20. When the cap body 12 is in the second position P2, the combining portion 20 is coupled to a bottom surface of the cap body 12, so that as the cap body 12 rotates in the second position P2, the protection cover 16 moves along with the cap body 12 and covers on the flexible printed circuit board 14.

Two track assemblies 22 and 24 are used to attach the main body 10 to the cap body 12 (shown in FIG. 2A). Take the track assembly 22 for example. The track assembly 22 includes a first track 221, a second track 223, and a sliding element 225. The first track 221 is fixed to the bottom surface of the cap body 12. The second track 223 has one end connected by a pivot to the cap body 12. The sliding element 225 is fixed to the main body 10 for coupling to the first track 221 and the second track 223. As the cap body 12 moves between the first position P1 and the second position P2, the sliding element 225 slides on the first track 221 and the second track 223. When the cap body 12 is in the second position P2, the sliding element 225 is coupled to the second track 223, thereby fixing the second track 223 on the main body 10 such that the cap body 12 and the first track 221 are capable of rotating relative to the main body 10 and the second track 223.

Preferably, a keyboard 26 is disposed on the upper surface of the main body 10. Moreover, a display device (not shown) is disposed on the upper surface of the cap body 12.

The main body 10 has a concave portion 101 (FIG. 2A and FIG. 5) on its upper surface for receiving the protection cover 16. Preferably, the shape of the concave portion 101 is substantially the same as that of the protection cover 16. The cap body 12 has two straight grooves 121 and 123 (FIG. 2A) for coupling to the combining portion 20 of the protection cover 16. When the cap body 12 covers on the main body 10, the protection cover 16 is positioned in the concave portion 101, and the combining portion 20 is coupled to the two straight grooves 121 and 123.

Figure 3:
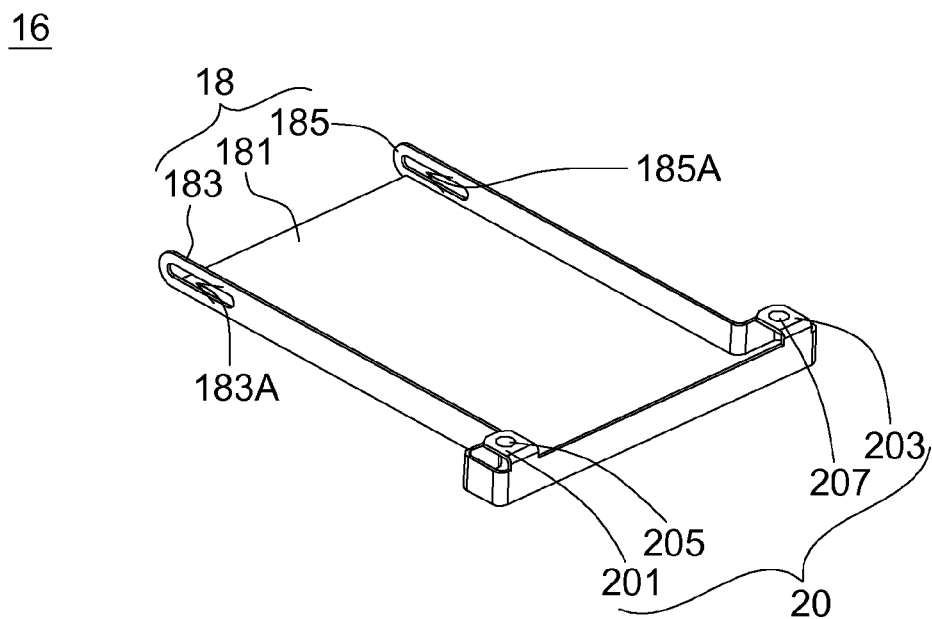
FIG. 3 shows the protection cover in FIG. 2A.
Figure 4:
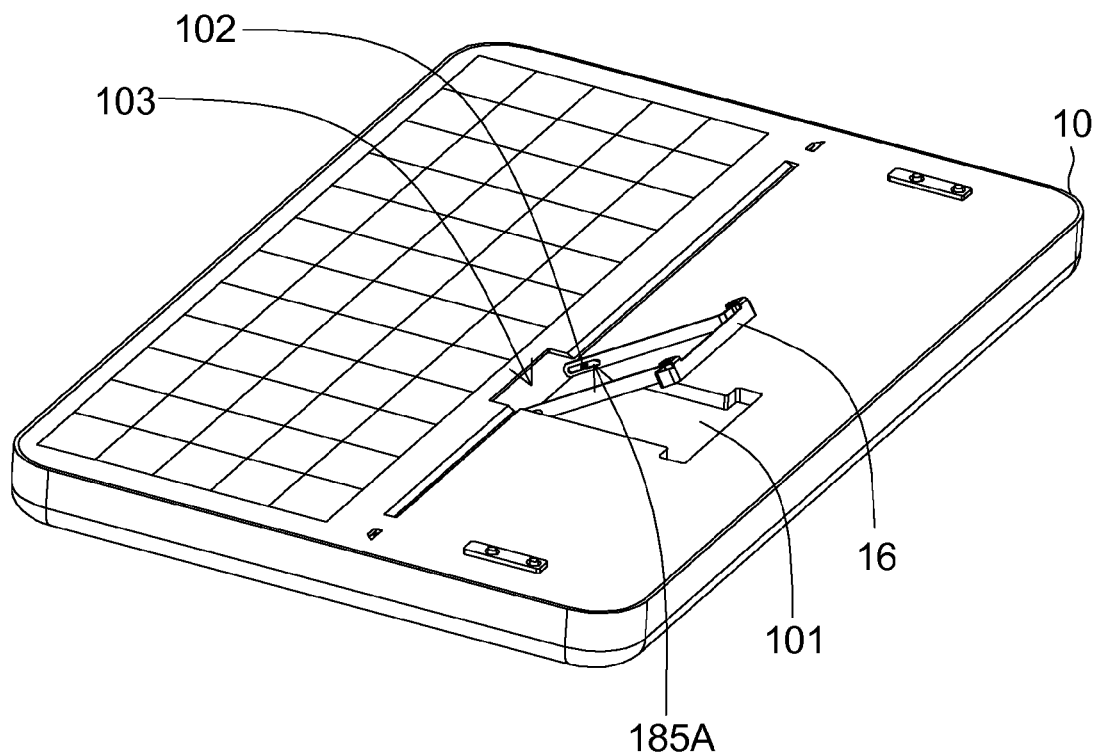
FIG. 4 is a diagram showing the combination of the main body and the protection cover in FIG. 2A.

FIG. 3 shows the protection cover in FIG. 2A, and FIG. 4 is a diagram showing the combination of the main body and the protection cover. The receiving portion 18 of the protection cover 16 includes a bottom plate 181 and two side plates 183 and 185. The two side plates 183 and 185 connect to two opposing edges of the bottom plate 181. The side plate 183 has a groove 183A, and the side plate 185 has a groove 185A. Grooves 183A and 185A allow two shafts 102 (shown in FIG. 4) of the main body 10 to slide in them. The bottom plate 181 and the two side plates 183 and 185 form a receiving space for receiving part of the flexible printed circuit board 14 (shown in FIG. 2B) when the cap body 12 is in motion.

The combining portion 20 of the protection cover 16 includes at least one hook for connecting to the bottom surface of the cap body 12. Two hooks 201 and 203, shown in FIG. 3, are used as an example in the embodiment. The hooks 201 and 203 connect to the front edge of the bottom plate 181, which is substantially perpendicular to the two opposing edges used for connecting to the two side plates 183 and 185. When the cap body 12 covers on the main body 10, the hooks 201 and 203 couple to the two straight grooves 121 and 123, respectively, on the bottom surface of the cap body 12. The combining portion 20 further includes at least one extrusion for fixing the hooks 201 and 203 on the cap body 12. Two extrusions 205 and 207 are used as an example. The extrusion 205 is positioned on the hook 201, and the extrusion 207 is positioned on the hook 203. The extrusions 205 and 207 are on the bottom surface of the hooks 201 and 203.

As shown in FIG. 4, the protection cover 16 is disposed in the concave portion 101 on the upper surface of the main body 10 and is capable of moving relative to the main body 10 by the use of the shafts 102 and the grooves 183A and 185A. The main body 10 has an opening 103 on its upper surface. The protection cover 16 and the main body 10 are attached adjacent to the opening 103. The flexible printed circuit board 14 (shown in FIG. 2B) passing through the opening 103 connects to both the main body 10 and the cap body 12.

Figure 5:
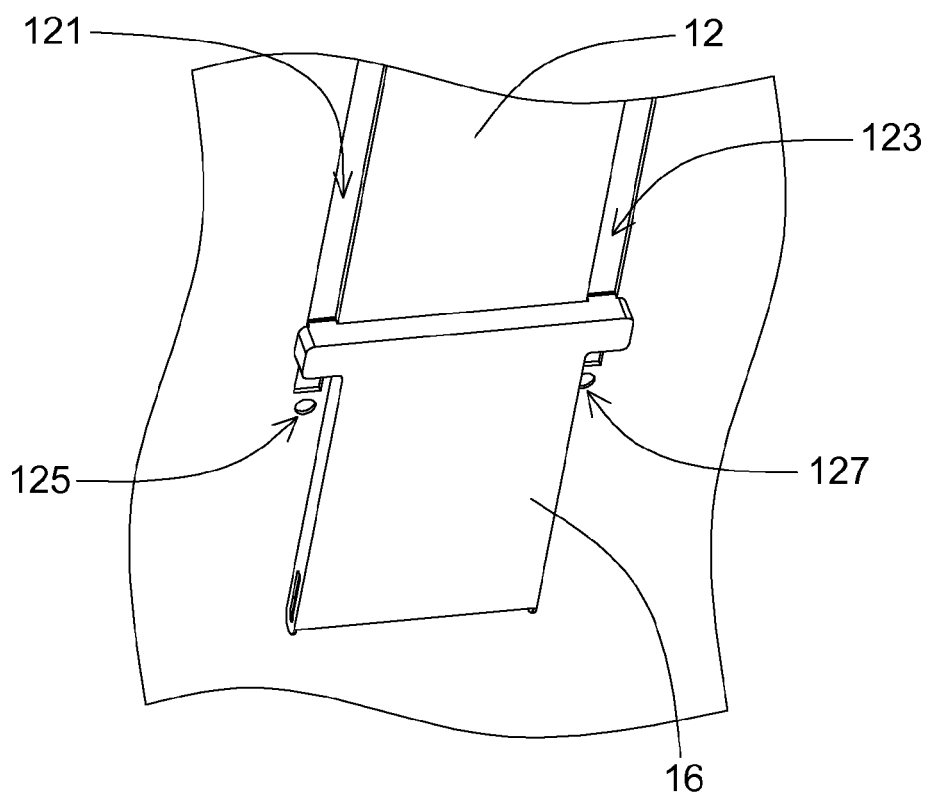
FIG. 5 shows part of the cap body and the protection cover in FIG. 2A before being attached.

FIG. 5 shows part of the cap body and the protection cover in FIG. 2A before being attached. Preferably, the cap body 12 has two notches 125 and 127 on its bottom surface for attaching to the two extrusions 205 and 207 (shown in FIG. 3) of the protection cover 16.

For moving the cap body 12 from the first position P1 to the second position P2 on the main body 10 as shown in FIGS. 1A and 1B, the protection cover 16 is positioned in the concave portion 101 (shown in FIG. 2A), and the hooks 201 and 203 slide along the two straight grooves 121 and 123 of the cap body 12. When the cap body 12 is in the second position P2, the two extrusions 205 and 207 (shown in FIG. 3) are inserted into the two notches 125 and 127 (shown in FIG. 5) to fix the protection cover 16 onto the cap body 12.

After the protection cover 16 and the cap body 12 are attached, and when the cap body rotates in the second position P2 (shown in FIGS. 1C and 1D), the protection cover 16 moves along with the cap body 12. As shown in FIG. 2A, although the rotation center of the cap body 12 relative to the main body 10 is not identical to the rotation center of the protection cover 16, the protection cover 16 can still smoothly move along with the cap body 12 by means of the grooves 183A and 185A and the shaft 102 (shown in FIG. 4). When the cap body 12 rotates relative to the main body 10, the protection cover 16 completely covers the flexible printed circuit board 14, as shown in FIGS. 2A and 2B.

The protection cover 16 is widely applied to electronic devices that have a folding or slide cover. The electronic devices are preferably portable or handheld devices. For example, electronic devices can be smart phones, personal digital assistant (PDA) phones, ultra mobile personal computers (UMPC), and similar devices. When users operate these devices, the protection cover that receives the flexible printed circuit board can prevent external damage to the circuit board.

Second Embodiment

Figure 6:
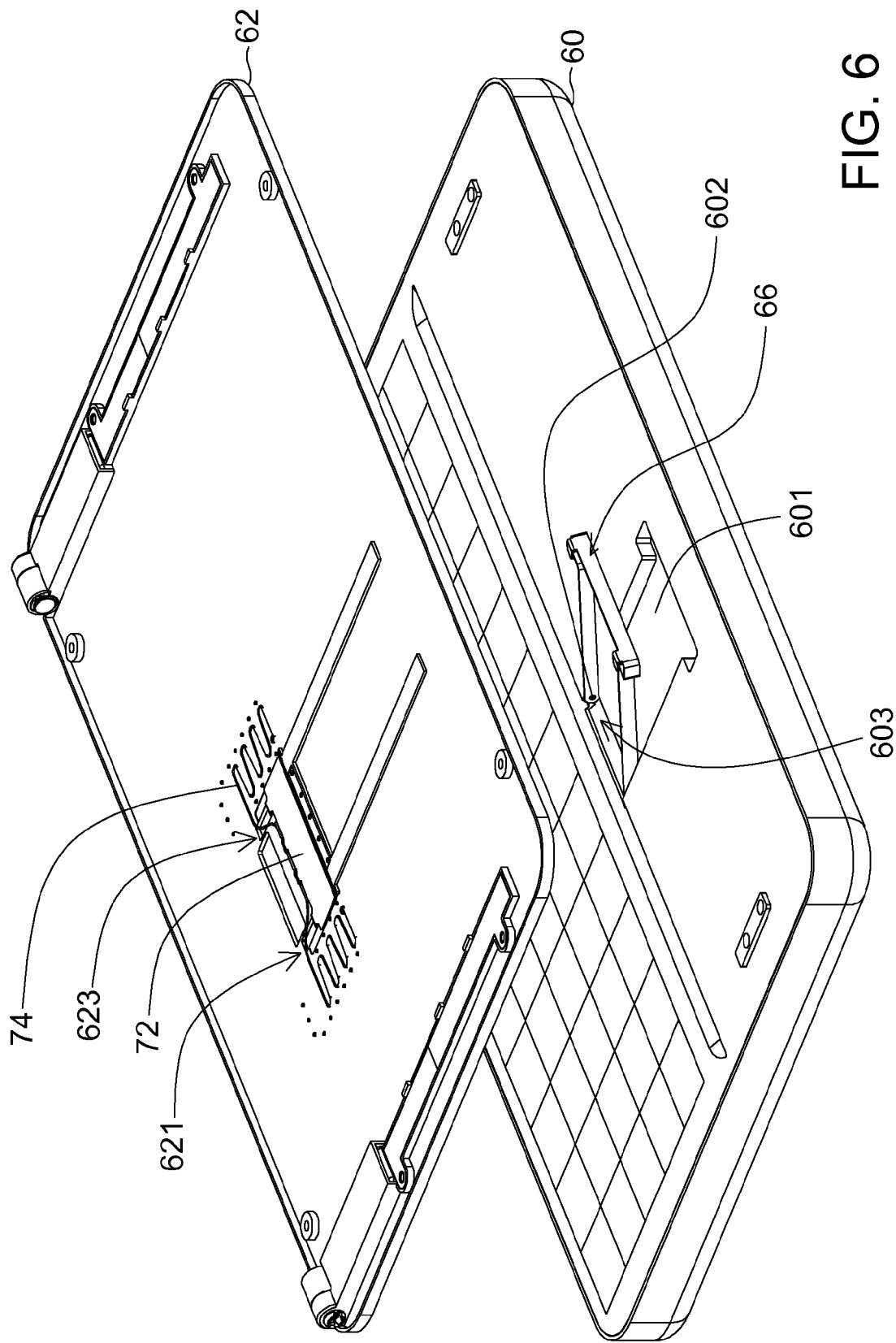
FIG. 6 shows an electronic device according to the second embodiment of the invention.
Figure 7:
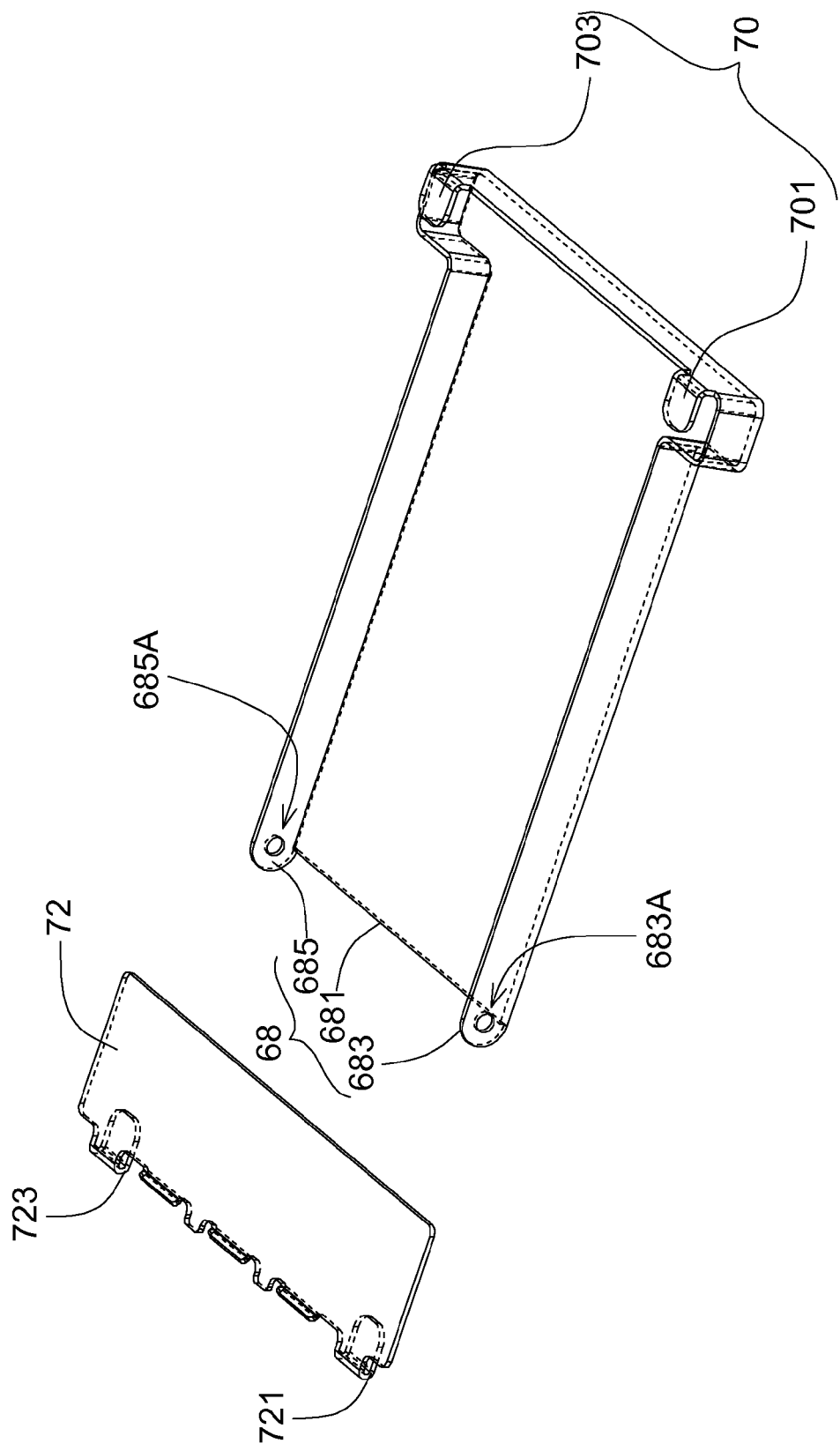
FIG. 7 shows the protection cover in FIG. 6.

The second embodiment differs from the first embodiment in the design of the protection cover. Therefore, the components in the second embodiment, which are the same as those in the first embodiment, are not explained here. FIG. 6 shows an electronic device according to the second embodiment of the invention. FIG. 7 shows the protection cover in FIG. 6. The main body 60 of the electronic device 6 has a concave portion 601 and an opening 603 on its upper surface. Adjacent to the concave portion 601 is the opening 603, which lets the flexible printed circuit board 64 (shown in FIG. 8A) pass through. The shape of the concave portion 601 is substantially the same as the shape of the protection cover 66, so that the concave portion 601 not only receives the protection cover 66 but also positions the same on the main body 60. The cap body 62 further includes two straight grooves 621 and 623 for coupling to the protection cover 66.

The protection cover 66 includes a receiving portion 68 and a combining portion 70, and is also cooperated by a sliding sheet 72 and an elastic element 74. The combining portion 70 attaches to one end of the receiving portion 68, and the other end of the receiving portion 68 is attached by a pivot to the main body 60 on the concave portion 601. The receiving portion 68 includes a bottom plate 681 and two side plates 683 and 685, wherein the side plates 683 and 685 attach to the two opposing edges of the bottom plate 681. The side plate 683 has a hole 683A, and the side plate 685 has a hole 685A. The holes 683A and 685A are for holding to the shafts 602 (only one is shown in FIG. 6) on the concave portion 601 so that the protection cover 66 can rotate relative to the main body 60. The combining portion 70 includes two first hooks 701 and 703 that connect to the front edge of the bottom plate 681. When the cap body 62 covers the main body 60, the first hooks 701 and 703 are positioned in the straight grooves 621 and 623, respectively.

The sliding sheet 72 and the elastic element 74 are disposed on the cap body 62. The elastic element 74 attaches to both the sliding sheet 72 and the cap body 62. The sliding sheet 72 has second hooks 721 and 723 positioned in the straight grooves 621 and 623, respectively, for attaching to the first hooks 701 and 703. Preferably, the elastic element 74 is a string spring that has two ends fixed on the cap body 62. Furthermore, part of the string spring is attached to the sliding sheet 72.

Figure 8A:
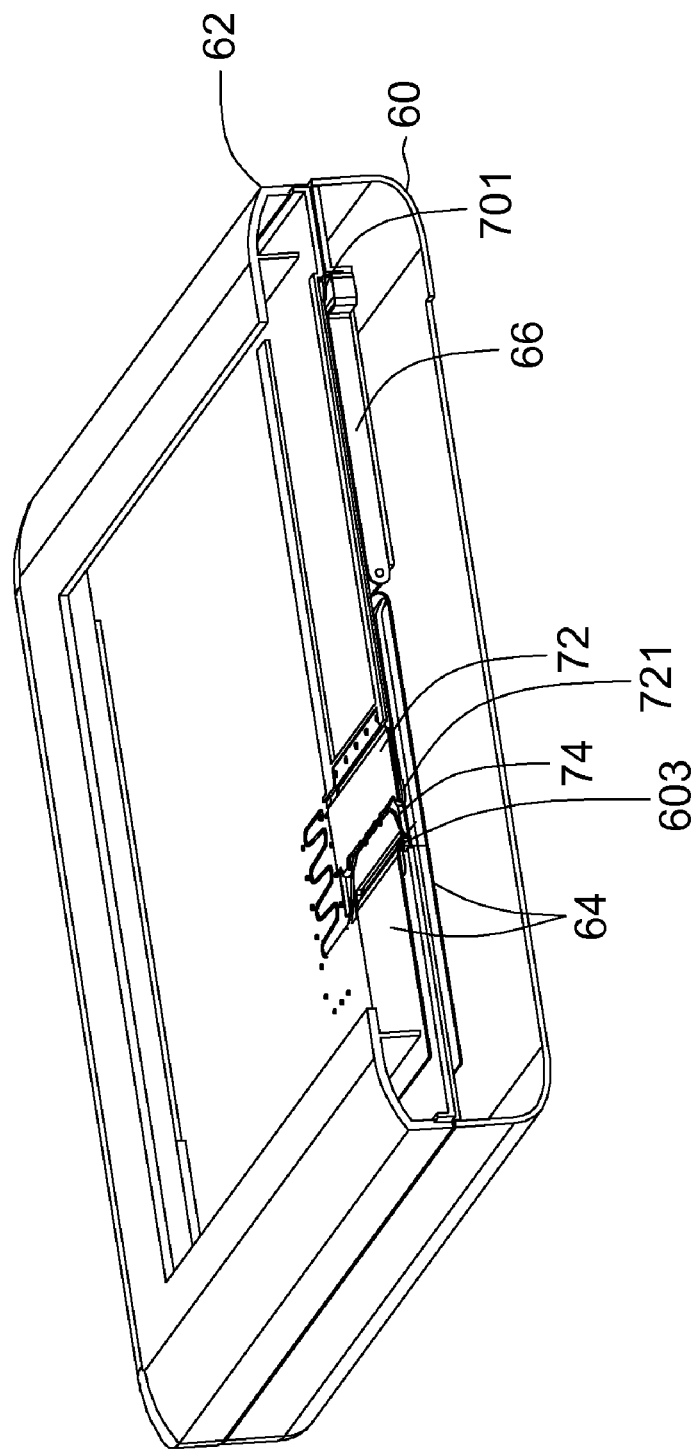
FIGS. 8A, 8B, 8D, and 8F show the electronic device of the second embodiment in continuous motion.

FIGS. 8A, 8B, 8D, and 8F show the electronic device of the second embodiment in continuous motion. FIG. 8C is an enlarged diagram of the electronic device in FIG. 8B. FIG. 8E is an enlarged diagram of the electronic device in FIG. 8D. As shown in FIG. 8A, when the cap body 62 covers on the main body 60, the protection cover 66 is positioned in the concave portion 601 (shown in FIG. 6), the sliding sheet 72 and the elastic element 74 are positioned on the bottom surface of the cap body 62, and the flexible printed circuit board 64 passing through the opening 603 attaches to both the main body 60 and the cap body 62.

Figure 8B:
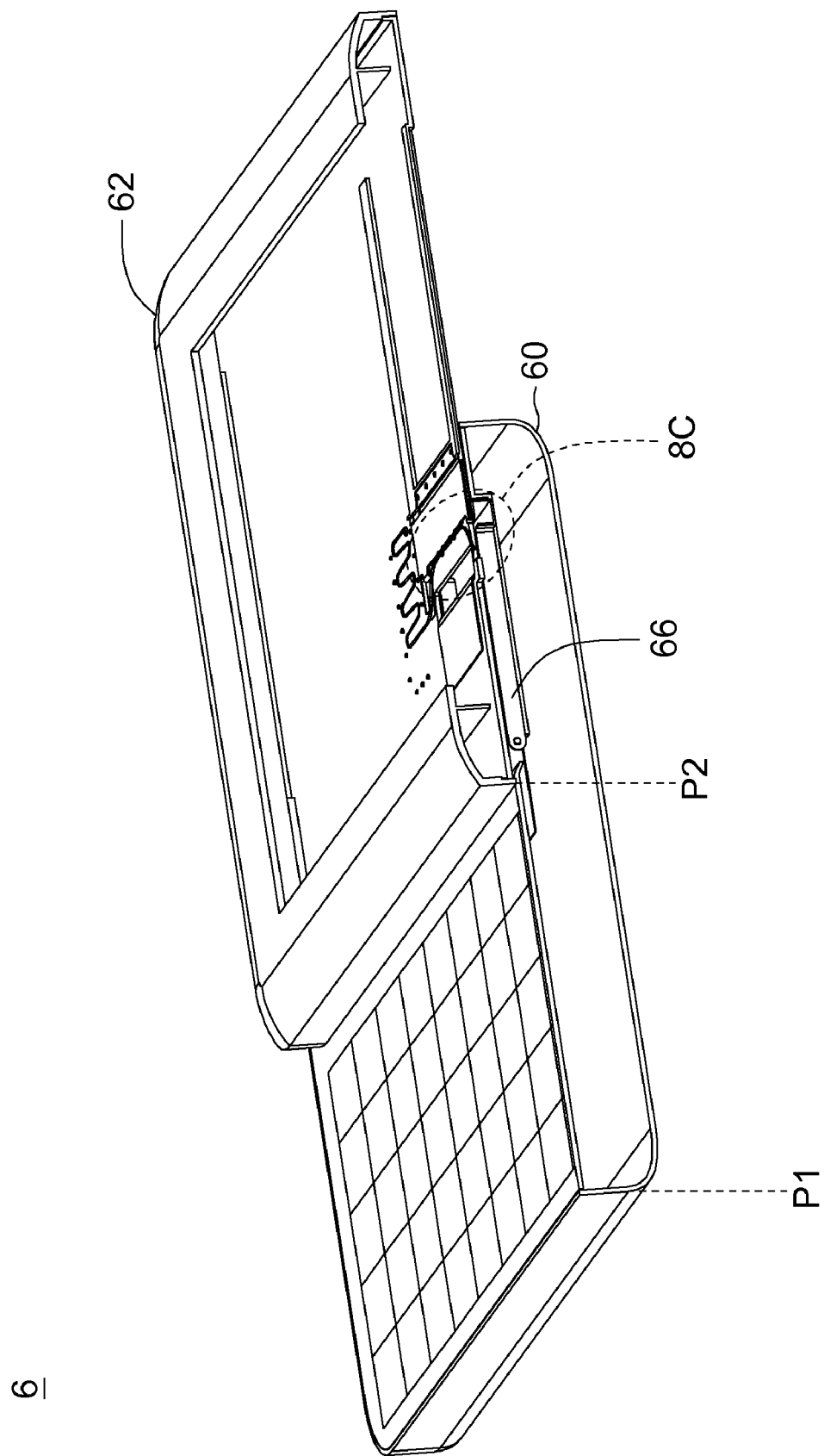

When the cap body 62 slides on the main body 60, the first hook 701 of the protection cover 66 slides along the straight groove 621 (not shown in FIG. 8A). As shown in FIGS. 8B and 8C, when the cap body 62 is in the second position P2, the first hook 701 couples to the second hook 721, and the first hook 703 (shown in FIG. 7) couples to the second hook 723 (shown in FIG. 7), so that the combining portion 70 (shown in FIG. 7) and the sliding sheet 72 are attached.

Figure 8D:
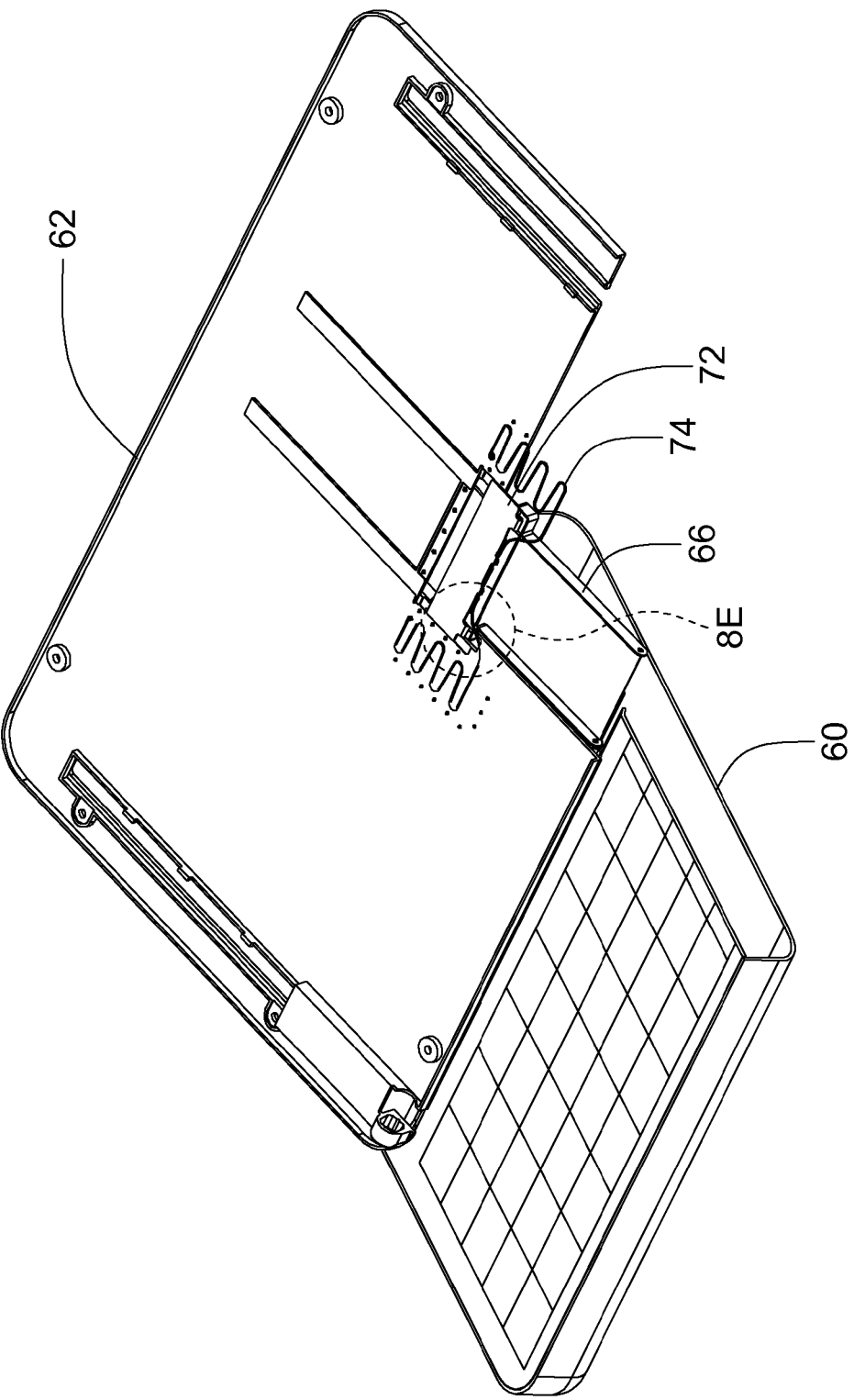
Figure 8F:
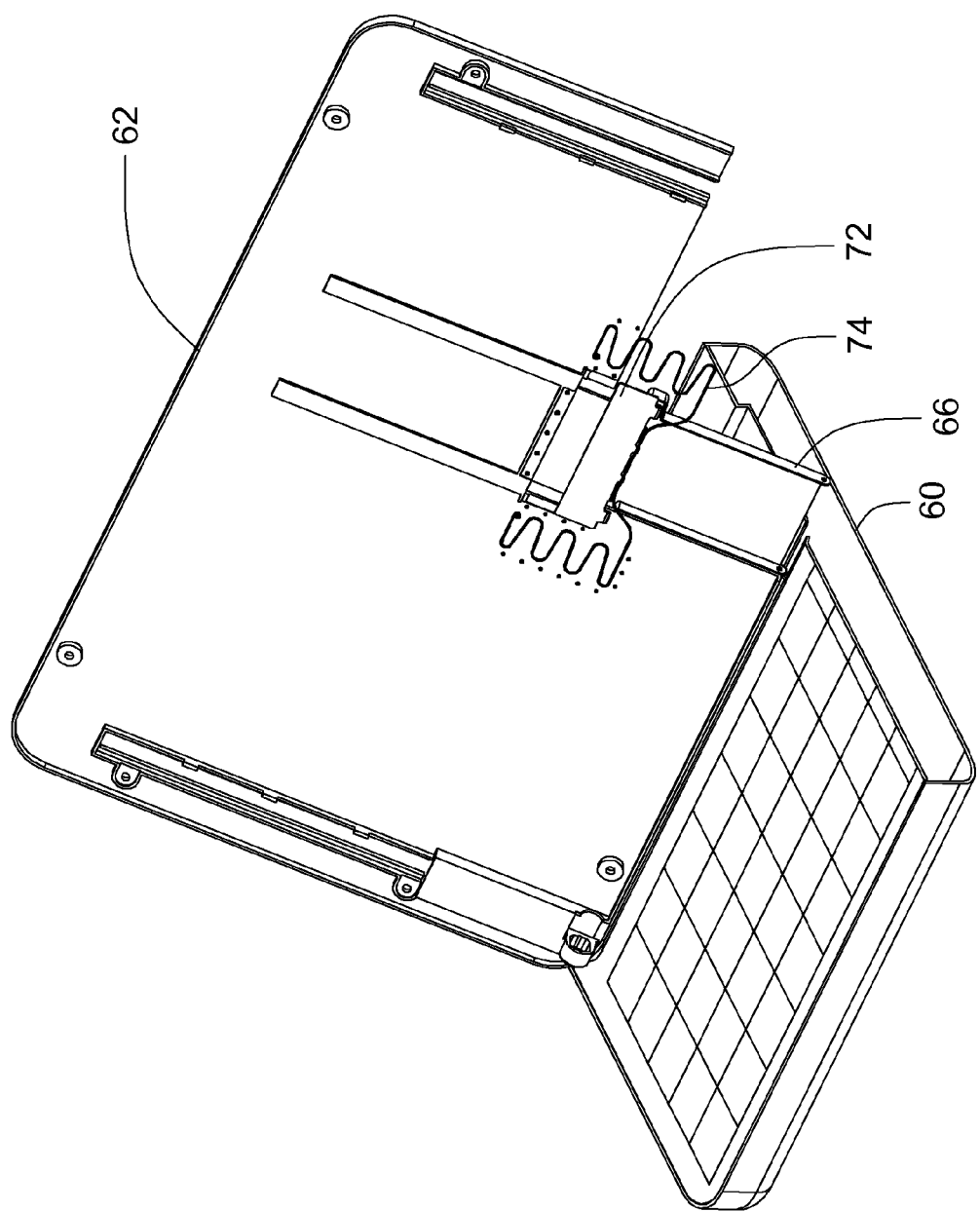

As shown in FIGS. 8D, 8E, and 8F, when the cap body 62 rotates relative to the main body 60, the protection cover 66 moves along with the cap body 62 via the sliding sheet 72. The rotation center of the cap body 62 rotating relative to the main body 60 is not identical to the rotation center of the protection cover 66. Therefore, when the cap body 62 rotates, one end of the protection cover 66 slides relative to the cap body 62, causing the first hook 703 (shown in FIG. 7) to move the second hook 723 along the straight groove 623.

It is noted that when the protection cover 66 moves along with the cap body 62, it applies a force to the sliding sheet 72 in the direction opposite to the force of the elastic element 74 on the sliding sheet 72. Hence, the protection cover 66 and the sliding sheet 72 are tightly attached.

Third Embodiment

Figure 9B:
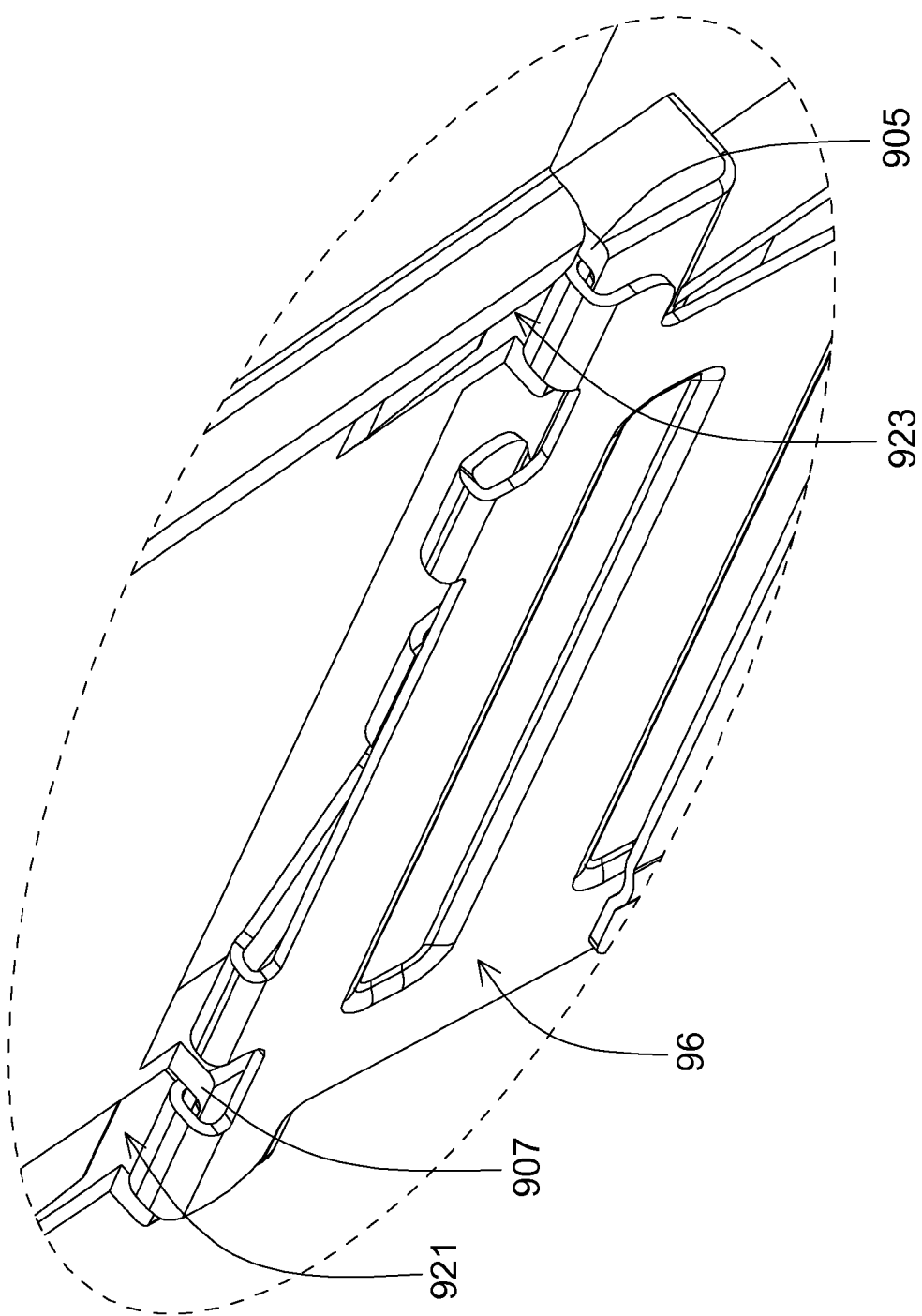
FIG. 9B is an enlarged diagram of the electronic device in FIG. 9A.

FIG. 9A shows an electronic device according to the third embodiment of the invention, and FIG. 9B is an enlarged diagram of the electronic device in FIG. 9A. The electronic device 9 includes a main body 90, a cap body 92, a flexible printed circuit board (not shown), a protection cover 96, and two track assemblies 97 and 98. The flexible printed circuit board connects to the main body 90 and the cap body 92. One end of the protection cover 96 is attached to the main body 90 by a pivot. The main body 90 and the cap body 92 are attached via the two track assemblies 97 and 98 so that the cap body 92 can slide on the main body 90 and rotate relative to the same. The track assembly 97, for example, includes a first track 971, a second track 973, and a sliding element 975. The first track 971 is fixed on the bottom surface of the cap body 92 by a pivot. The second track 973 has one end connected to the cap body 92. The sliding element 975 is fixed on the main body 90 for coupling to the first track 971 and the second track 973. When the cap body 92 slides on the main body 90, the sliding element 975 slides on the first track 971 and the second track 973. When the cap body 92 is in the second position P2, the sliding element 975 couples to the second track 973, thereby fixing the second track 973 on the main body 90, and then the cap body 92 and the first track 971 are capable of rotating relative to the main body 90 and the second track 973.

As shown in FIG. 9B, the other end of the protection cover 96 is positioned in two straight grooves 921 and 923 on the bottom surface of the cap body 92 and attached to two concave plates 905 and 907. Therefore, when the cap body 92 rotates relative to the main body 90, the protection cover 96 moves along with the cap body 92 and covers the flexible printed circuit board.

Figures 10A, 10B:
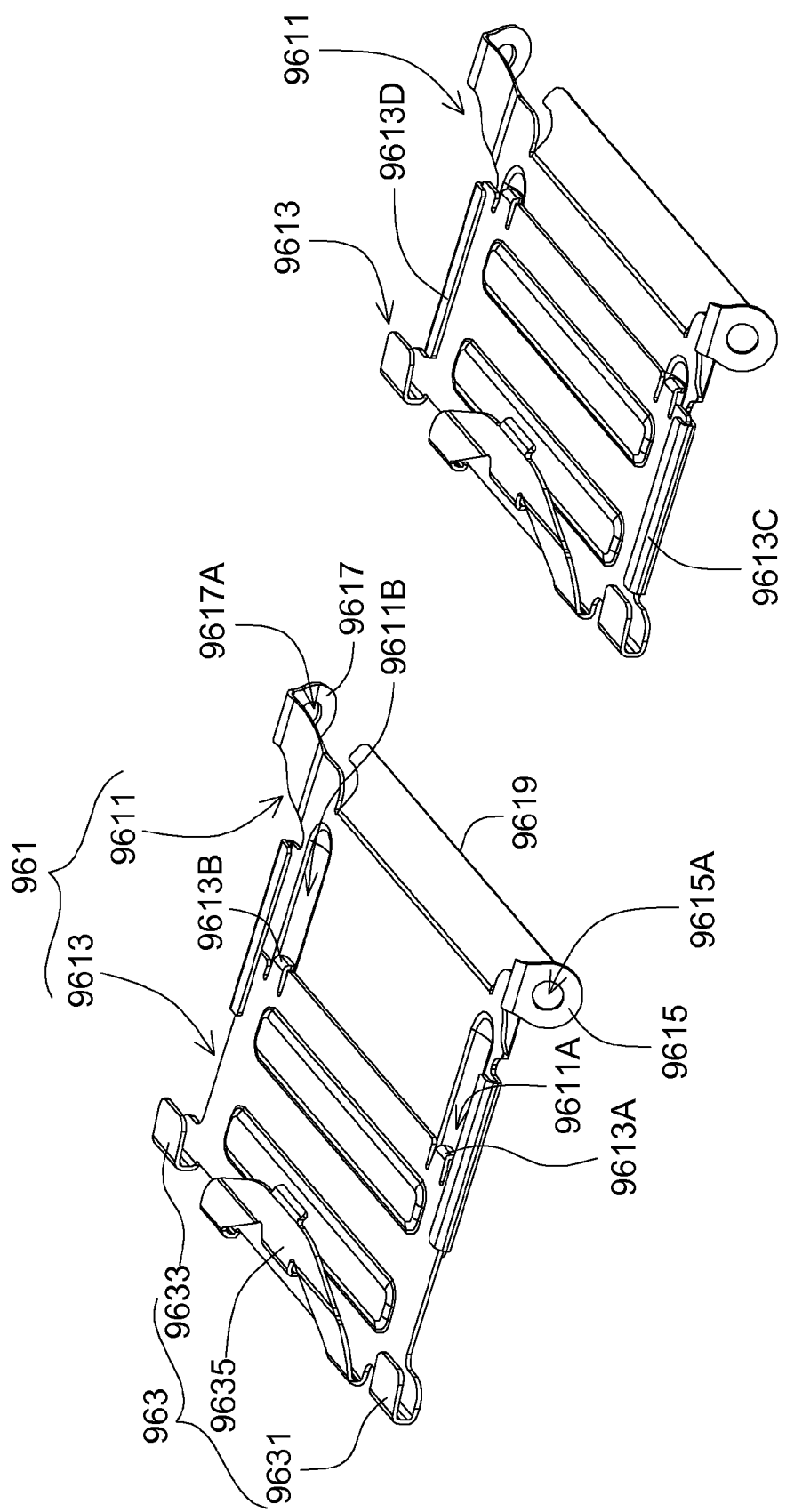
FIGS. 10A and 10B show the protection cover in FIG. 9A.

FIGS. 10A and 10B show the protection cover in FIG. 9A. The protection cover 96 includes a receiving portion 961 and a combining portion 963. The receiving portion 961 includes a first piece 9611 and a second piece 9613. The second piece 9613 couples to the first piece 9611 by sliding and attached to the combining portion 963.

The first piece 9611 includes two side elastic sheets 9615 and 9617, two grooves 9611A and 9611B, and a shovel-shaped sheet 9619. The side elastic sheet 9615 has a hole 9615A, and the side elastic sheet 9617 has a hole 9617A. The holes 9615A and 9617A are for attaching the first piece 961 to the main body 90 (shown in FIG. 9A).

The second piece 9613 includes two extrusions 9613A and 9613B, and two bent plates 9613C and 9613D. The extrusions 9613A and 9613B couple to the grooves 9611A and 9611B, respectively, so that the second piece 9613 is capable of sliding relative to the first piece 9611. The length of the grooves 9611A and 9611B is substantially the sliding distance of the second piece 9613 sliding relative to the first piece 9611. The bent plates 9613C and 9613D clip onto two opposing edges of the first piece 9611 for attaching the first piece 9611 to the second piece 9613.

The combining portion 963 includes two hooks 9631 and 9633 and an elastic sheet 9635. The hooks 9631 and 9633 and the elastic sheet 9635 attach to the front edge of the second piece 9613, and the elastic sheet 9635 is positioned between the two hooks 9631 and 9633. The hooks 9631 and 9633 and the elastic sheet 9635 are for attaching to the cap body 92, so that the protection cover 96 can move along with the cap body 92.

Figure 11A:
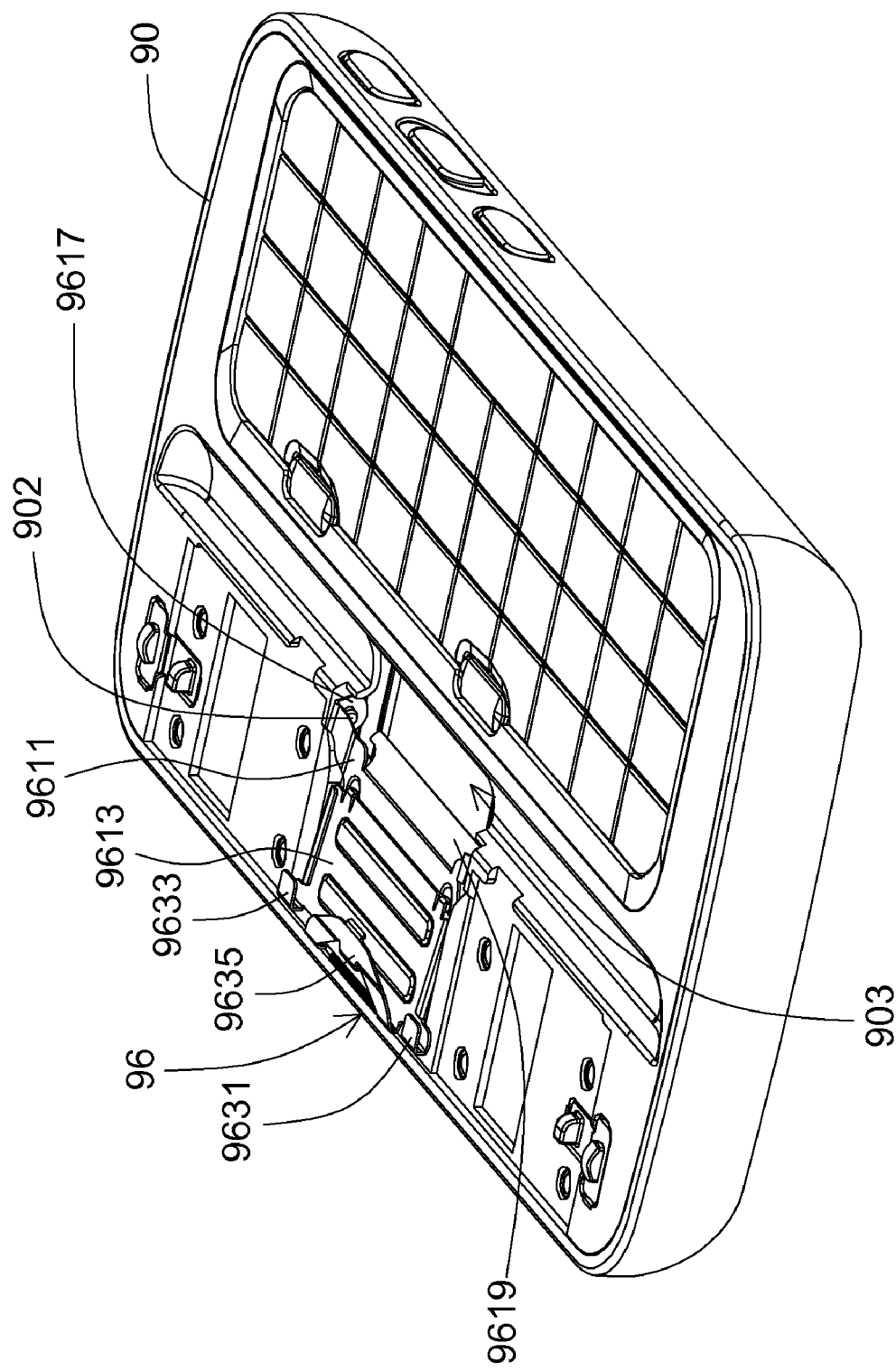
FIG. 11A shows the protection cover pressing close to the main body.
Figure 11B:
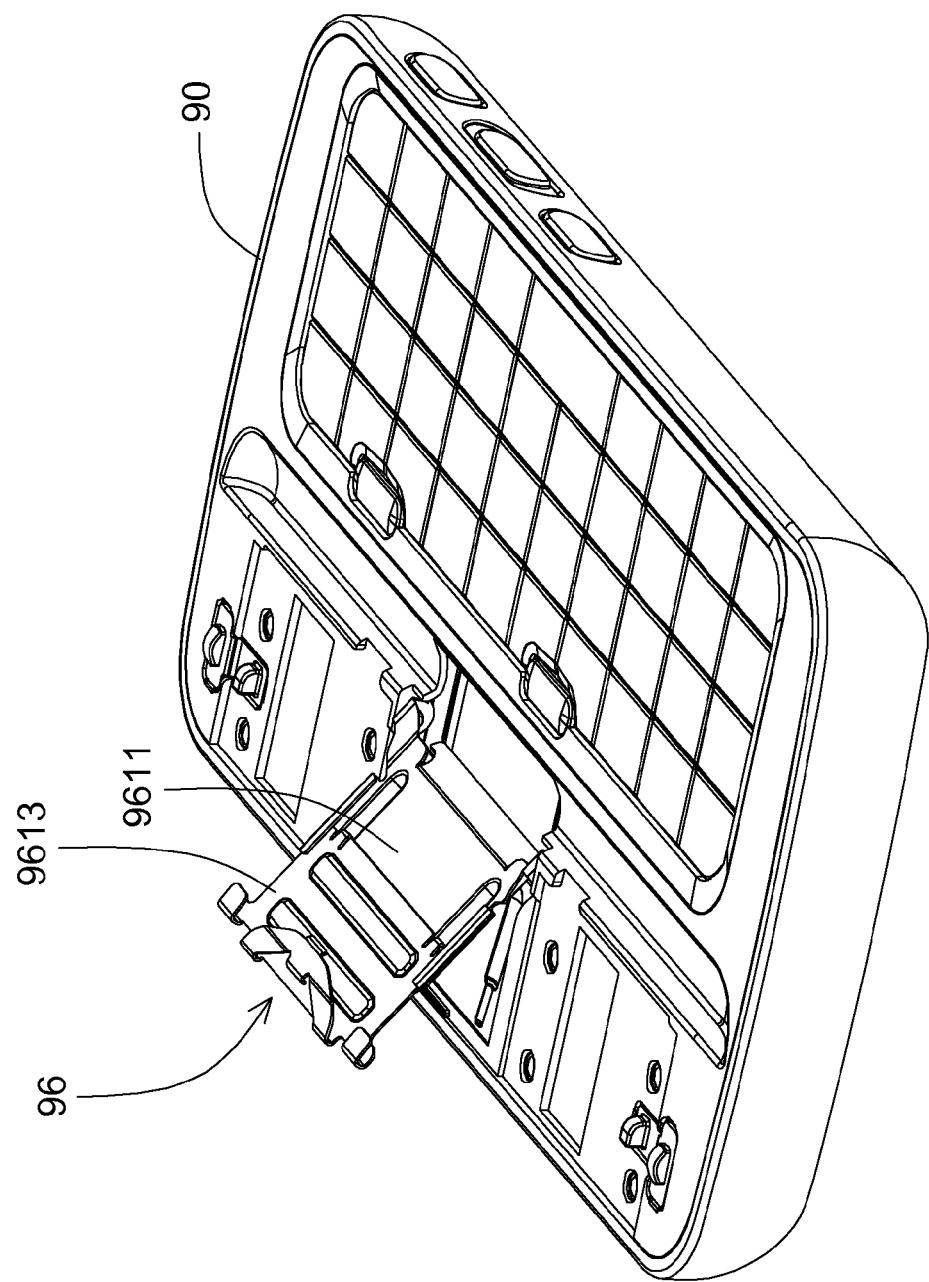
FIG. 11B shows the rotation and sliding of the protection cover in FIG. 11A.

FIG. 11A shows the protection cover pressing close to the main body, and FIG. 11B shows the rotation and sliding of the protection cover in FIG. 11A. When the cap body 92 covers the main body 90, the protection cover 96 is pressed close to the main body 90 as shown in FIG. 11A. Also, the first piece 9611 and the second piece 9613 do not slide relative to each other yet. The shovel-shaped sheet 9619 is positioned in an opening 903 of the main body 90 for preventing the flexible printed circuit board from being scraped and for covering the flexible printed circuit board when the cap body 92 rotates relative to the main body 90. The hooks 9631 and 9633 and the elastic sheet 9635 protrude outwardly from the second piece 9613. Moreover, before the cap body 92 rotates relative to the main body 90, the elastic sheet 9635 is pre-pressed by the cap body 92.

The protection cover 96 is attached to the main body 90 by the shafts 902. Due to the elasticity of the side elastic sheets 9615 (not shown in FIG. 11A) and 9617, the side elastic sheets 9615 and 9617 can be pressed inward, such that the shafts 902 can be inserted into the holes 9615A and 9617A (shown in FIG. 10A) to attach the first piece 9611 to the main body 90. Since the second piece 9613 can slide relative to the first piece 9611, when the protection cover 96 moves along with the cap body 92, its total length is adjustable, as shown in FIG. 11B.

Figure 12A:
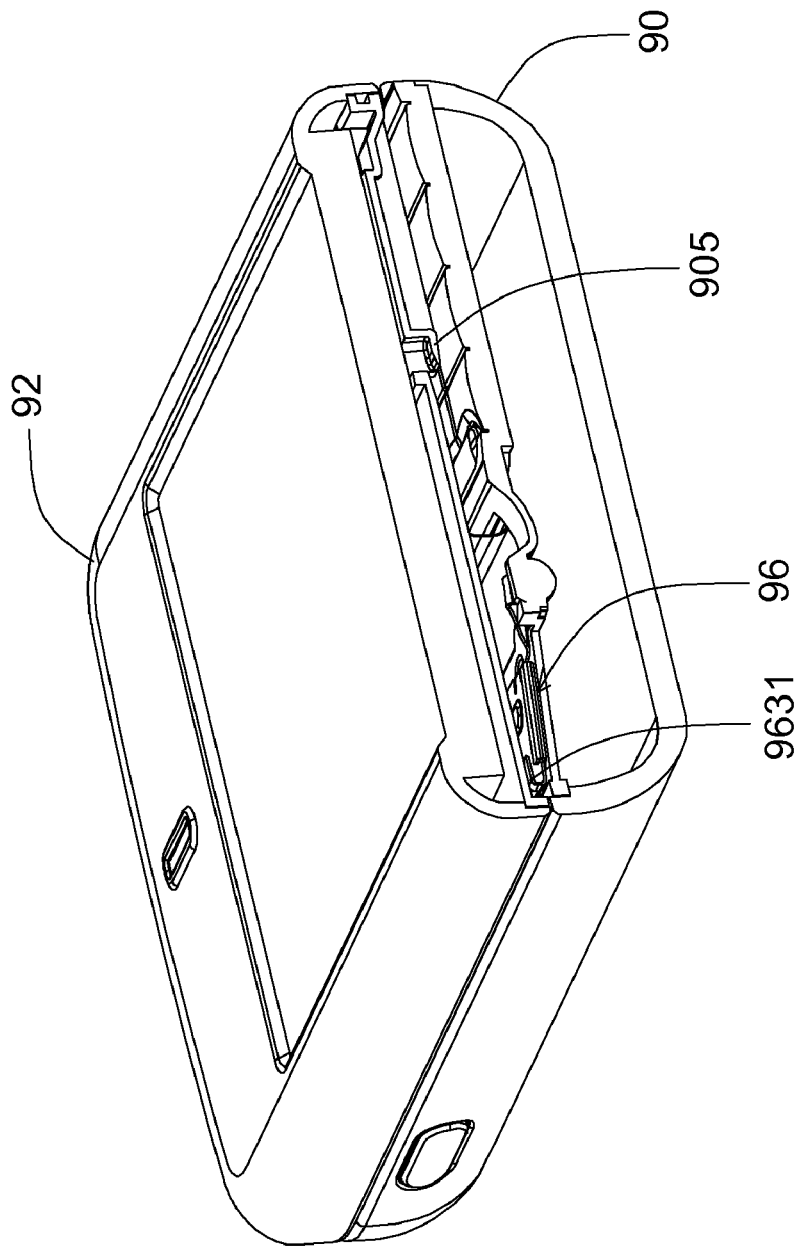
FIGS. 12A, 12B, and 12D show the electronic device of the third embodiment in continuous motion.
Figure 12B:
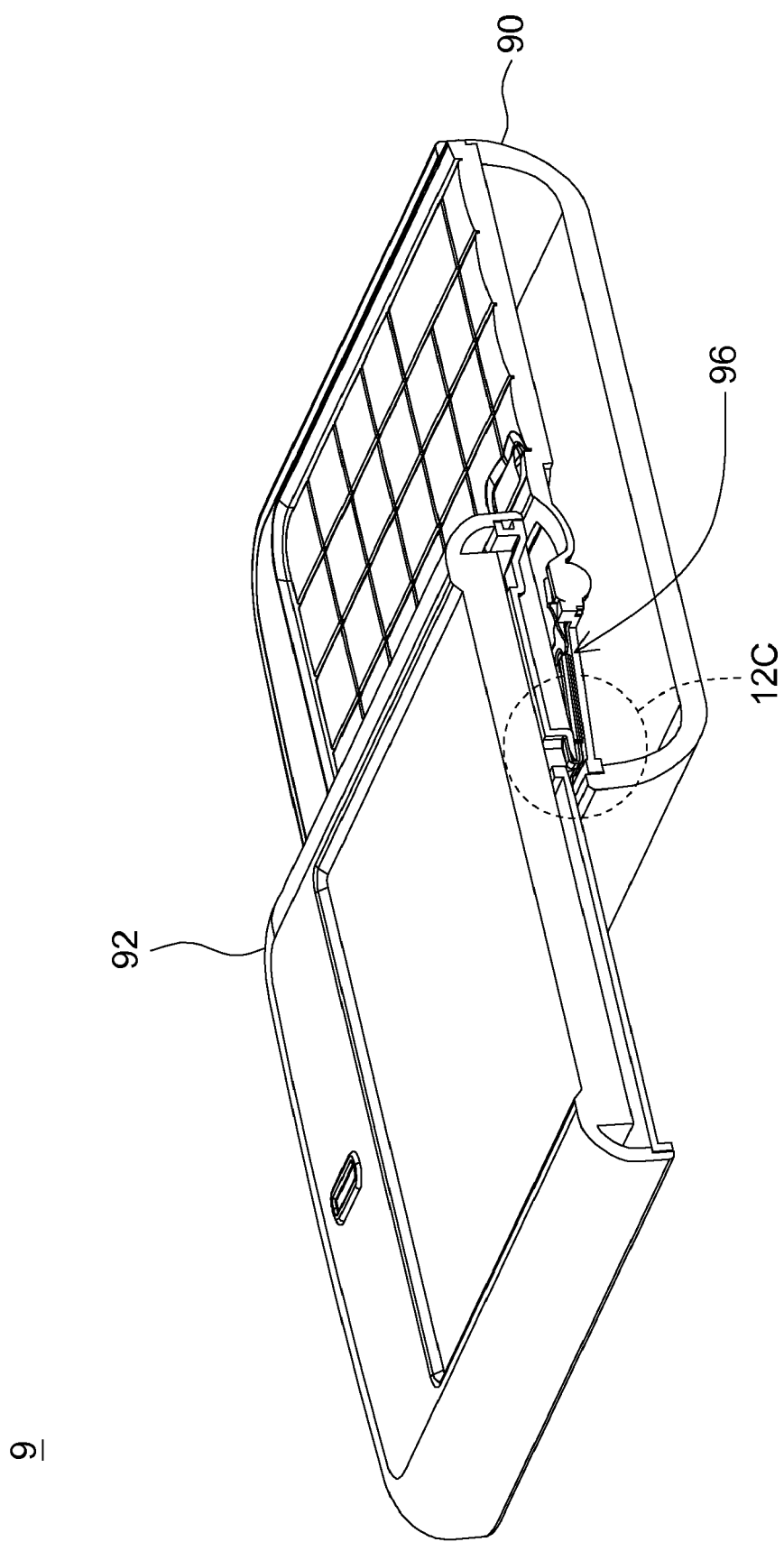
Figure 12C:
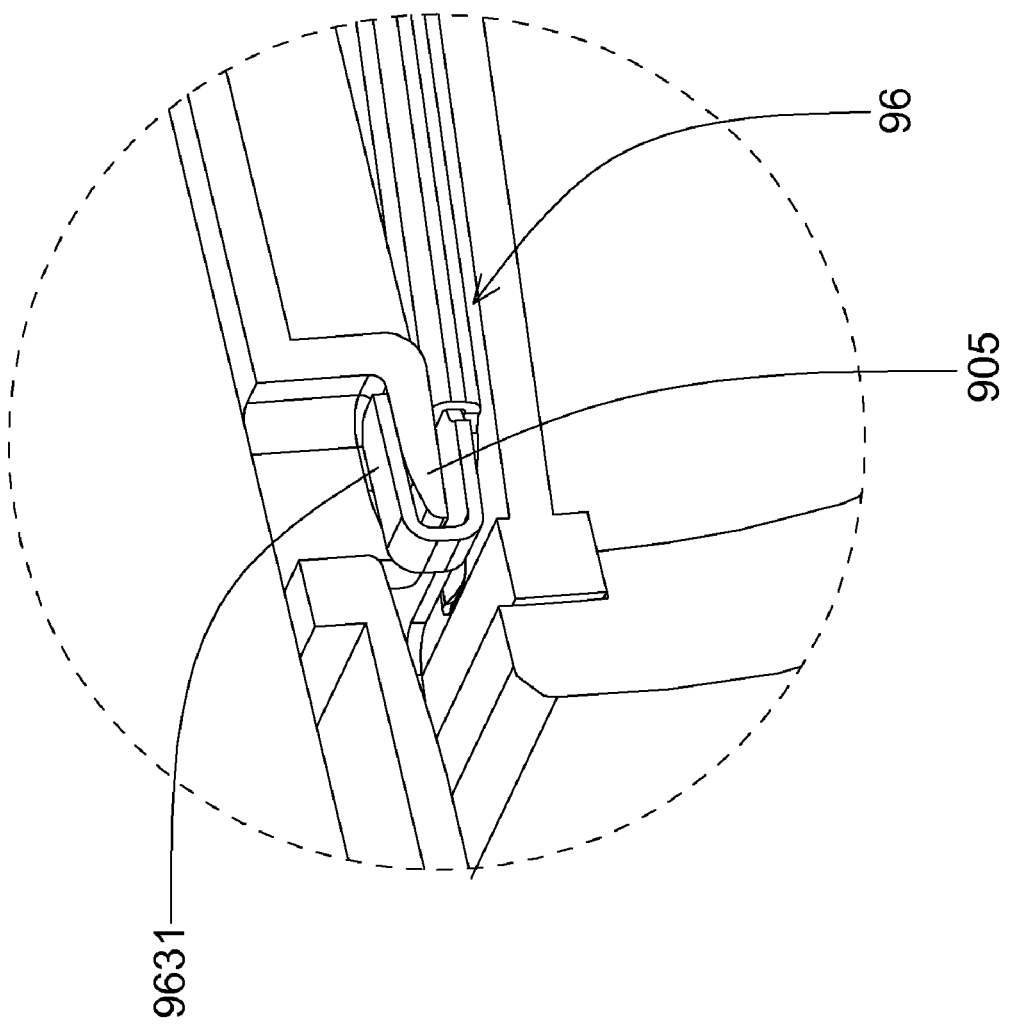
FIG. 12C is an enlarged diagram of the electronic device in FIG. 12B.
Figure 12D:
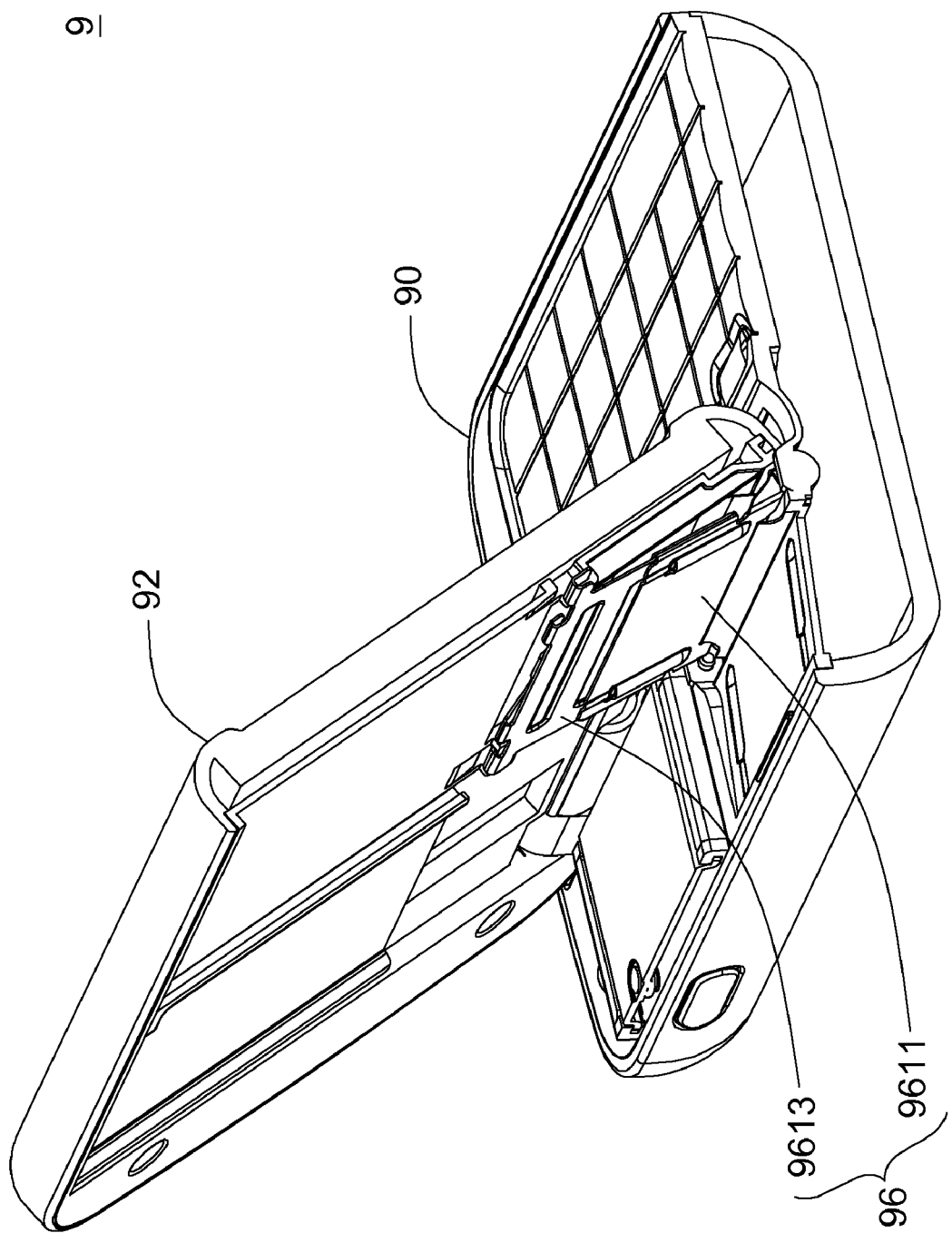

FIGS. 12A, 12B, and 12D show the electronic device of the third embodiment in continuous motion, and FIG. 12C is an enlarged diagram of the electronic device in FIG. 12B. As shown in FIGS. 12A to 12C, when the cap body 92 covers the main body 90, the hooks 9631, 9633 (not shown in FIG. 12A) and the protection cover 96 are pressed close to the main body 90 by the cap body 92. When the cap body 92 slides on the main body 90 for a distance, the hook 9631 will couple to the concave plate 905, so that one end of the protection cover 96 is fixed to the cap body 92. In addition, the elastic sheet 9635 (shown in FIG. 10A) of the protection cover 96 will spring out to attach to the cap body 92.

The rotation center of the protection cover 96 rotating relative to the main body 90 is not identical to that of the cap body 92, so that the moving path of the protection cover 96 is not the same as that of the cap body 92. Therefore, when the cap body 92 rotates relative to the main body 90, the second piece 9613 slides on the first piece 9611 to adjust the length of the protection cover 96, as shown in FIG. 12D, for completely covering the flexible printed circuit board (not shown).

The protection cover disclosed herein in each of the above embodiments is hidden between the main body and the cap body of the electronic device. When the cap body rotates relative to the main body, the protection cover moves along with the cap body to cover the flexible printed circuit board that attaches to the main body and the cap body. Therefore, the flexible printed circuit board can be protected effectively while operating the electronic device, and its probability of failure is reduced accordingly.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A protection cover used in an electronic device having a cap body, a main body and a flexible printed circuit board, comprising:
    a receiving portion having a first end and a second end, wherein the first end is coupled to an upper surface of the main body; and
    a combining portion connecting to the second end of the receiving portion;
    wherein as the cap body moves from a first position to a second position on the main body, the combining portion is coupled to a bottom surface of the cap body, so that when the cap body rotates in the second position, the protection cover moves along with the cap body and covers the flexible printed circuit board.

2. The protection cover according to claim 1, wherein the receiving portion comprises a bottom plate and two side plates, the two side plates connect to two opposing edges of the bottom plate for coupling to the main body.

3. The protection cover according to claim 2, wherein the main body comprises two shafts for coupling to the two sides plates so that the receiving portion rotates relative to the main body.

4. The protection cover according to claim 3, wherein each of the two side plates comprises a groove for coupling to one of the two shafts.

5. The protection cover according to claim 2, wherein each of the two side plates comprises a hole for coupling to one of the two shafts.

6. The protection cover according to claim 2, wherein the combining portion comprises at least one first hook connecting to a front edge of the bottom plate, and the front edge is substantially perpendicular to the two opposing edges;
    when the cap body moves on the main body, the first hook is coupled to the cap body by sliding.

7. The protection cover according to claim 6, wherein the combining portion further comprises an extrusion positioned on the first hook;
    when the cap body is in the second position, the extrusion is coupled to the cap body for fixing the second end of the receiving portion on the cap body.

8. The protection cover according to claim 6, further comprising:
    a sliding sheet having at least one second hook; and
    an elastic element connected to the sliding sheet and the cap body;
    wherein as the cap body is in the second position, an elastic force of the elastic element applies to the sliding sheet for combining the second hook of the sheet with the first hook of the combining portion.

9. The protection cover according to claim 8, wherein the elastic element is a string spring, part of the string spring is fixed on the sliding sheet, and two ends of the string spring are fixed on the cap body.

10. The protection cover according to claim 1, wherein the receiving portion comprises:
    a first piece pivotally connected to the main body; and
    a second piece slidably coupled to the first piece, connecting to the combining portion;
    wherein when the cap body rotates in the second position, the first piece slides relative to the second piece.

11. The protection cover according to claim 10, wherein the main body comprises two shafts for coupling to the first piece.

12. The protection cover according to claim 11, wherein the first piece comprises two holes for coupling to the two shafts.

13. The protection cover according to claim 10, wherein the combining portion comprises an elastic sheet and at least one hook connecting to a front edge of the second piece.

14. The protection cover according to claim 13, wherein when the cap body is in the second position, the hook is coupled to the cap body, and the elastic sheet is positioned on the cap body.

15. The protection cover according to claim 13, wherein when the cap body slides to the second position, the elastic sheet is released from a pre-pressed state to insert into the cap body for fixing the receiving portion on the cap body.

16. An electronic device, comprising:
    a main body;
    a cap body movably disposed on the main body, wherein the cap body moves between a first position and a second position on the main body, and the cap body rotates relative to the main body when the cap body is in the second position;

a flexible printed circuit board connecting to the main body and the cap body; and any of protection covers in claims 1 to 15;

wherein as the cap body moves to the second position, the combining portion is coupled to a bottom surface of the cap body, so that when the cap body rotates in the second position, the protection cover moves along with the cap body and covers the flexible printed circuit board.

17. The electronic device according to claim 16, wherein the main body comprises a concave portion on its upper surface for receiving the protection cover.

18. The electronic device according to claim 17, wherein the shape of the concave portion is substantially the same as that of the protection cover.

19. The electronic device according to claim 16 wherein the main body comprises an opening on its upper surface, the receiving portion and the main body are connected adjacent to the opening, and the flexible printed circuit board passing through the opening connects to the main body and the cap body.

20. The electronic device according to claim 16, further comprising:

a keyboard disposed on the upper surface of the main body; and a display device disposed on the upper surface of the cap body.

* * * * *